Edward I. Gilbert
William A. Rogers
INVENTORS

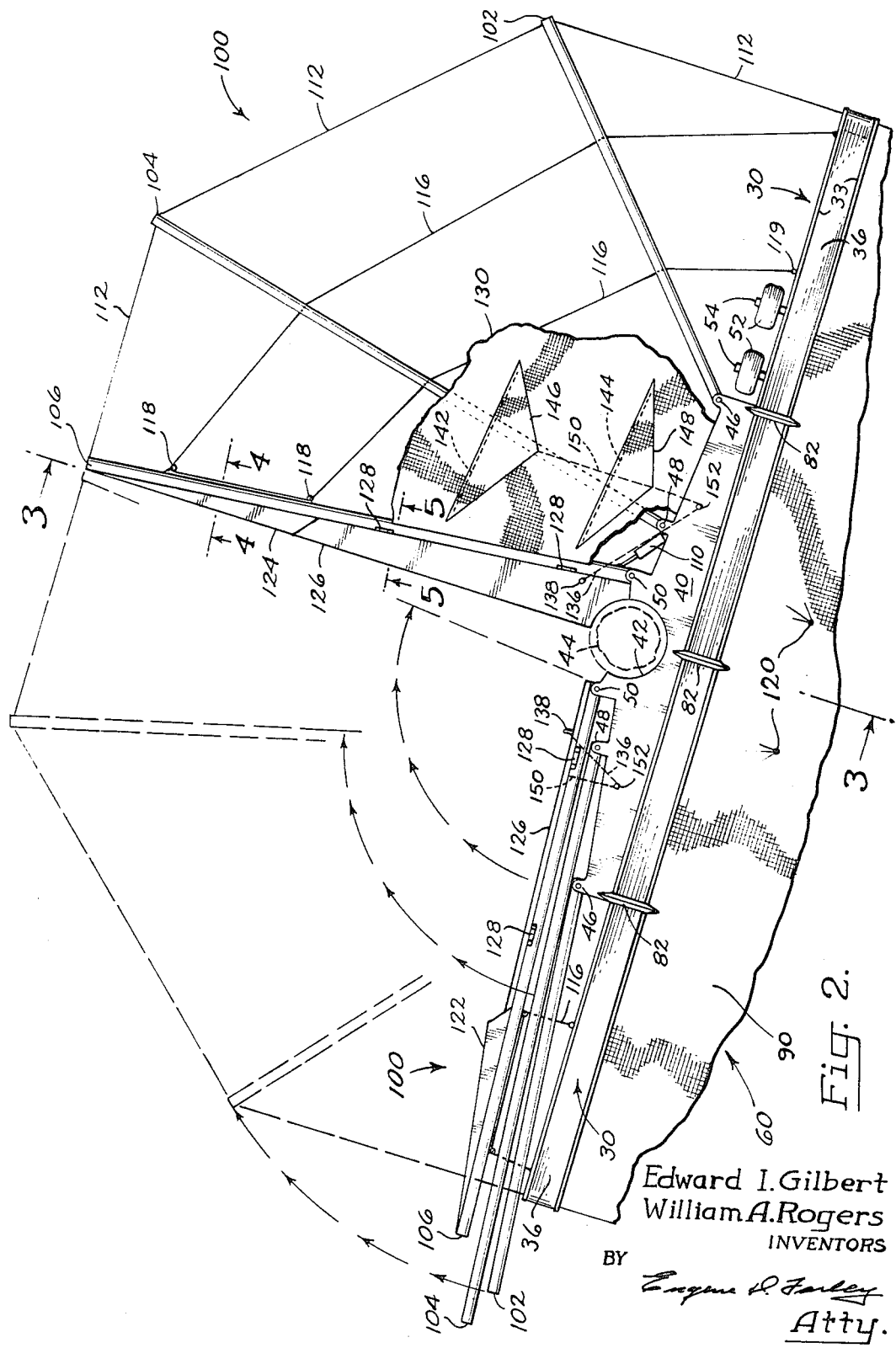

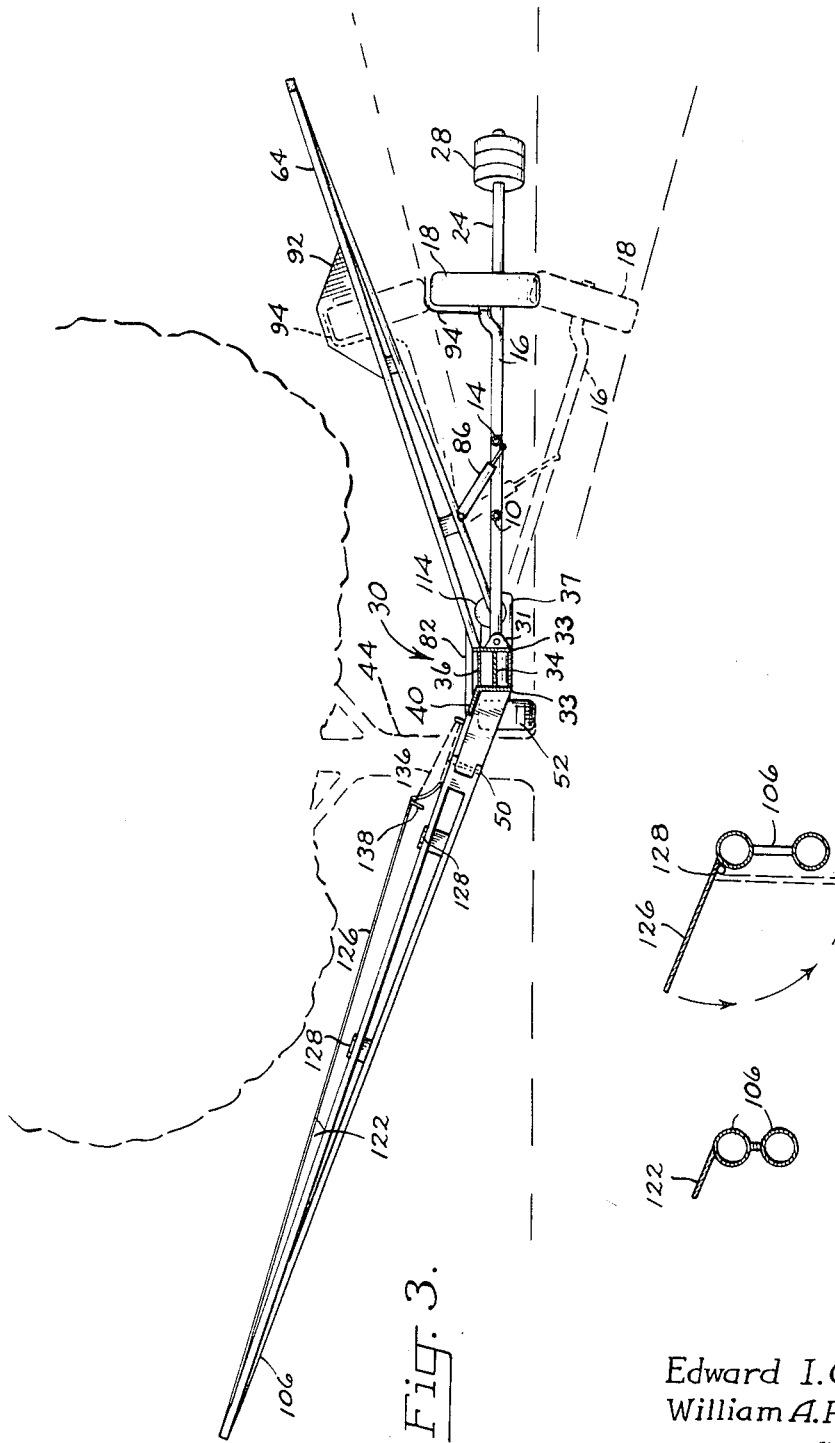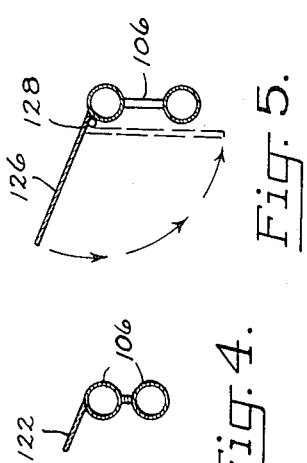

United States Patent Office 3,412,539
Patented Nov. 26, 1968

3,412,539
HARVESTING APPARATUS FOR FRUITS AND NUTS
Edward I. Gilbert, Rte. 1, and William A. Rogers, 757 NE. 10th St., both of The Dalles, Oreg. 97058
Filed May 16, 1966, Ser. No. 550,350
11 Claims. (Cl. 56—329)

This invention relates to harvesting apparatus for fruits and nuts. It pertains particularly to harvesting apparatus of the class mounted on a wheeled vehicle which may be driven beneath a fruit or nut tree and which is provided with web members extendable to underlie the tree for collecting fruits and nuts dislodged therefrom.

It is the general purpose of the present invention to provide a mobile harvester for fruits and nuts which is characterized by the following objects and advantages:

(1) It is readily maneuverable so that it may be placed closely adjacent the trunk of the tree in optimum collecting position, even though the surrounding terrain is irregular or steeply sloped.

(2) It can be used on steeply sloping terrain, irrespective of whether the slope falls away to the right or to the left of the apparatus.

(3) It may be used with equal efficiency to collect the fruit from trees of high, low or average profile.

(4) It collects the fruit efficiently, rapidly, and without injury.

(5) It guides the fruit uniformly toward a centrally located conveyer which delivers the fruit to a central handling station, for example, to a trailer towed by the vehicle.

(6) It is of sturdy, durable construction and protected from damage while performing its maneuvering and collecting functions.

(7) It reduces the possibility of fruit hang-up in the fruit collecting components of the apparatus as well as against the trunk and branches of the tree.

(8) Although unsymmetrical in construction, it functionally is balanced at all times and under all conditions of travel.

In the drawings:

FIG. 2 is a fragmentary plan view of the apparatus, illustrating the manner of converting the apparatus from its collapsed transport condition to its extended, harvesting condition;

Figure 1:
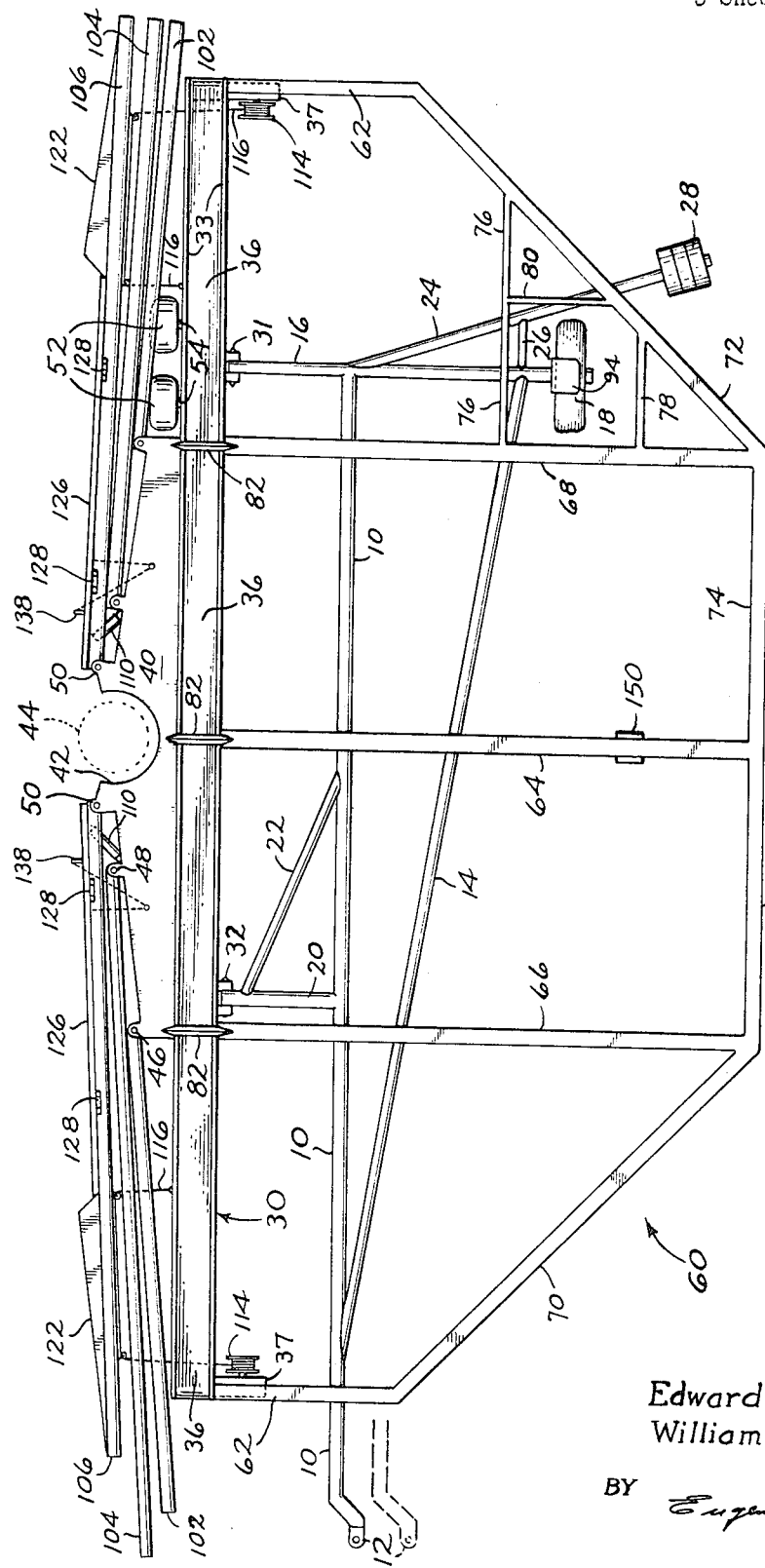
FIG. 1 is a plan view of the herein described harvesting apparatus, illustrated in its maneuvering or transport condition and with its web covering removed, better to reveal its underlying construction.

FIG. 3 is a transverse sectional view taken along line 3—3 of FIG. 2 and illustrating the manner of application of the apparatus to the harvesting operation; and FIGS. 4 and 5 are detail, sectional views taken along lines 4—4 and 5—5, respectively, of FIG. 2 and illustrating the construction of means included in the apparatus for guiding the fruit as it is collected away from the trunk of the tree so that it is not bruised thereby.

In its broadest aspect, the fruit and nut harvesting apparatus of our invention comprises an elongated wheeled frame adapted to be towed by a tractor or otherwise maneuvered adjacent the trunk of a tree. The frame mounts a central collecting trough extending parallel to the longitudinal axis of the frame and positioned on one side of the tree trunk immediately adjacent the same. A fixed web section dimensioned to underlie substantially one-half of the tree is fastened to the side of the collecting trough away from the trunk. A pair of angularly collapsible collecting web sections, each dimensioned to underlie substantially one quarter of the tree, are fastened to the side of the trough adjacent the tree trunk, embracing the same.

Drive means are connected to the fixed web section for moving it angularly in a vertical plane between elevated and lowered positions as required to compensate for sloping terrain. Second drive means are connected to the angularly collapsible collecting web sections for reciprocating them in a substantially horizontal plane between extended positions wherein their adjacent edges meet, providing a collecting surface beneath the tree, and collapsed positions wherein they lie tucked alongside the trough, in the transport position of the apparatus.

Guide means are associated with the collapsible web sections to guide the fruit away from the tree trunk as it moves along the web into the trough. Counterweight means are associated with the frame for properly orienting the center of gravity of the apparatus as required to prevent its tipping over when used on sloping ground. Means also are associated with the coverings of the web sections to maintain them tight and functional when in their collecting positions.

Considering the foregoing in greater detail and with particular reference to the drawings:

The presently described harvesting apparatus is mounted on an elongated wheeled frame designed not only to support the collecting elements of the apparatus but also to maneuver the apparatus through a crowded orchard or over difficult terrain, and to place the collecting elements in the optimum position for gathering all of the fruit from each tree without hang-up and without damage to the fruit.

The vehicle frame thus includes a tongue 10 terminating forwardly in a connecting eye 12 offset laterally in the direction away from the tree trunk. A second longitudinal frame member 14 is angled outwardly away from member 10 and with its supports a transversely arranged axle 16. Axle 16 mounts one or more automotive-type wheels 18 through the agency of automotive spindles and bearings.

The main frame also includes a laterally extending support member 20, a diagonal brace 22, a counterweight support bar 24, a brace 26 for the latter, and a counterweight 28 divided into segments and removably supported on the outwardly extending end of bar 24.

The frame or chassis thus comprised is hinged to a collecting trough 30 which extends the length of the apparatus and pivotally is connected to members 16, 20 of the frame by heavy pivot pins 31 and 32 respectively.

Trough 30 has for its function collecting the fruit and conveying it toward a convenient handling station. It is comprised of a pair of spaced, parallel side plates 33 and a connecting bottom plate 34. A conventional conveyer 36 driven by motor 37 works in the trough and conveys the fruit rearwardly to a handling station where it is placed in suitable containers.

To facilitate bringing the apparatus into an operating position closely adjacent the tree trunk, there is provided an apron 40 which is welded along the central portion of trough 30, on the side opposite the vehicle chassis. Apron 40 is arranged in an upwardly tilted angle to the horizontal. It is provided with a central, arcuate cut-away portion 42 which received the trunk 44 of the tree. It also is provided with laterally extending perforated tabs 46, 48, 50, the purpose of which will appear hereinafter.

Also supported on trough 30, on the side opposite the vehicle frame, are a pair of aligned wheels 52. These may comprise small diameter pneumatic wheels of the aircraft type and are journaled on spindles 54 through the agency of suitable ball or roller bearings. They cooperate with wheel 18 in supporting the rearward end of the apparatus, the forward end being supported on the tractor or other towing vehicle by means of the forwardly projecting end of tongue 10.

Supported on the mobile frame thus provided is a sectional web designed to collect the fruit and guide it gravitationally into collecting trough 30. The web is provided in three segments.

A fixed, non-collapsible segment is supported on the side of trough 30 away from trunk 44 of the tree. It underlies approximately one-half of the tree.

Two horizontally collapsible segments are supported on apron 40, one on each side of cut-away portion 42. These are reciprocatable angularly between extended positions in which each underlies approximately one-quarter of the tree and collapsed positions wherein each is tucked alongside the trough, this being the transport position of the apparatus.

The fixed web section, indicated generally at 60, is supported on a plurality of longitudinally spaced, laterally extending booms including a pair of end booms 62, a central boom 64 and a pair of intermediate booms 66, 68. The outer ends of the booms are suitably braced and interconnected as by means of diagonal brace members 70, 72 and longitudinal connector 74.

In addition, a wheel well is defined by structural members 76, 78, 80. This is dimensioned to receive wheel 18 in the tilted side-hill position of the apparatus, as will be shown hereinafter.

Braces 82 interconnect booms 64, 66, 68 and apron 40. They function to hold the web frame members at a predetermined angle of tilt, indicated in FIG. 3, at which the fruit will gravitate down the web and into trough 30.

Means also are provided for adjusting the angular positions of the apparatus frame and the above described web frame relative to each other as required to compensate for varying conditions of ground slope. This feature of the apparatus also is illustrated in FIG. 3.

To this end there is provided a single-acting, fluid operated cylinder 86, the case of which pivotally is connected to the underside of central boom 64 and the piston rod of which pivotally is connected to diagonally arranged, longitudinal frame member 14. Operation of the cylinder results in adjustment of the relative positions of the vehicle frame and collecting web frame as required to adjust for ground slope, whether the slope lies upwardly or downwardly.

The fixed collecting web section is overlaid with a suitable fabric cover 90 of heavy wear resistant material painted with an aircraft type paint and, if desired, waxed to facilitate the transmission of the fruit to trough 30. The fabric is suitably attached to the underlying frame, the points of attachment being along the lengths of booms 62, 64, 66, connections 70, 72, 74 and the adjacent side wall of trough 30.

The fabric cover of the fixed collecting frame also includes an elevated section 92 supported by an angular support member 94 and dimensioned to contain wheel 18, when the position of the harvester places wheel 18 in the wheel well defined by frame elements 68, 76, 78, 80.

The construction and mode of operation of the angularly collapsible web sections indicated generally at 100 are shown particularly in FIG. 2.

The angularly collapsible web sections are positioned on the side of trough 30 opposite fixed collecting web 60. Each underlies substantially one-quarter of the tree and is angularly shiftable in a horizontal plane between an extended fruit-collecting position and a retracted transport position.

Each of web sections 100 is mounted on a plurality of radially extending, horizontal booms 102, 104, 106 pivoted for angular movement in a horizontal plane on tabs 46, 48, 50, respectively, extending outwardly from apron 40, FIG. 2.

Booms 102, 104, 106 are extended by a suitable drive, for example, by a fluid-operated cylinder 110, the case of which pivotally is connected to apron 40 and the piston rod of which is connected to the inner end of boom 106. A cable 112 is attached to the outer ends of booms 102, 104, 106, as well as to the rearward end of trough 30. Accordingly, when cylinder 110 is extended, moving boom 106 to its extended position, the cable draws booms 102, 104 fanwise to their extended positions.

The booms are restored to their collapsed positions by a drive which includes an hydraulic windlass 114. The windlass mounts a cable 116 which extends through suitably positioned guideways through each of booms 102, 104, 106, and is reeved about spaced pulleys 118 centrally located on boom 106. The end of cable 116 remote from windlass 114 is tied to an eye 119 on trough 30.

Accordingly, as cylinder 110 is advanced, extending the booms, windlass 114 pays out cable 116 as required to accommodate the boom motion. The booms are maintained in their extended position during operation of the apparatus by the fluid lock in cylinder 110. When it is desired to collapse the booms, cylinder 110 is relaxed and 114 energized to take in on cable 116.

It is to be noted that the two sets of booms 102, 104, 106 meet at imaginary, independent pivot points 120. These pivot points are located behind trough 30. This makes it possible to extend the collapsible members completely around the tree trunk, eliminating the gap which otherwise would be present.

Like the fixed collecting web assembly 60, collapsible collecting segments 100 are arranged at an operative angle, particularly apparent in FIG. 3, which permits the fruit to gravitate downwardly into trough 30. To prevent bruising the fruit, guide means are provided which guide the fruit away from the trunk.

The guide means provided is in the form of segmental saddle formed in four parts, two being attached to each of booms 106. The outer segments 122 are welded or otherwise fixed to the outer portion of the booms at an upwardly inclined angle evident in FIG. 4. The lower segments 126, however, are hinged to the lower portions of the booms by means of hinges 128, as seen in FIG. 5. They thus can collapse to the dotted outline position of FIG. 5 when the booms are moved to their collapsed, transport position.

The two collapsible frameworks thus provided are covered separately with fabric 130. Like fabric 90, this may comprise canvas or other tough, durable material coated with aircraft paint and waxed. The fabric quadrants are secured to the supporting structures by being attached along the lengths of booms 106, aprons 40, trough 30, and cables 112.

In addition, the fabric quadrants are supported centrally by cables 116. This is of particular importance when the booms are collapsed, since during the collapsing operation the cables are shortened by the operation of windlass 114 and prevent the fabric from dragging on the ground.

Means are provided for supporting guide sections 126 in their elevated position when collecting web sections 100 are extended. The means employed for this purpose comprise elastic cords 136, one end of which is attached to apron 40 and the other end of which is attached to a short post 138 extends upwardly from guide section 126.

When the collecting web sections are moved from their harvesting to their transport position, the points of attachment of elastic cords 136 move together, relieving the tension of the cords on post 138 and allowing guide sections 126 to swing downwardly into their transport positions. This makes it possible to pull the apparatus close to the tree trunk. It also makes it easier to maneuver the apparatus so that the trunk is received in recess 42 of apron 40.

Means are provided for preventing fabric quadrants 130 from binding when the booms supporting them are collapsed. This is accomplished by cutting a pair of slits 142, 144 through the fabric generally parallel to each other as well as to the adjacent outer edge of apron 40. Triangular shaped fabric flaps 146, 148 overlie the respective slits. Both flaps are connected to a common elastic cord 150, the inner end of which is attached to post 152 on apron 40. This post also may be employed, if desired, for attaching to the apron the elastic cord 136 by means of which guide member 126 is elevated. Fabric 140 thus covers its respective quadrant smoothly, without binding or wrinkling when the booms which support it are extended angularly.

*Operation*

The operation of the presently described apparatus is as follows:

The laterally offset tongue 10 of the apparatus in its collapsed FIG. 1 position is attached to the drawbar of a tractor. Counterweight 28 is adjusted, if necessary, to stabilize the assembly. Collecting web assembly 60 is adjusted by means of cylinder 86 so that its angular elevation is appropriate to the slope of the terrain and the height of the branches of the selected tree.

The apparatus is drawn beneath the tree, the drawbar being in the dotted line position of FIG. 1. The tractor is turned to the left and backed. This locates trunk 44 of the tree centrally in recess 42 in apron 40.

Collecting web sections 100 next are extended. This is accomplished by extending cylinders 100, moving booms 106 angularly to the extended position of FIG. 2. Each boom 106 carries with it booms 102, 104, tied to it by cable 112.

As the web sections open, elastic cords 136 act to elevate guide flaps 126. Also, elastic cords 150 act to keep flaps 146, 148 in their stretched, operative condition, insuring a smooth non-wrinkled surface.

With both of the collapsible sections extended, there results a web collector which is octagonal in outline and which extends beyond the drip line of the tree on all side.

Next, conveyor 36 is actuated in a direction such as to transport the fruit rearwardly of the apparatus, toward a handling station at which it may be boxed and transferred to an accompanying trailer or other vehicle.

The branches of the tree then are shaken, either manually or mechanically. As the fruit falls, it is collected on web sections 60, 100 and gravitates downwardly into conveyor 30. During this action it is kept from bruising contact with the trunk of the tree by the action of guide flaps 124, 126.

The gravitational movement of the fruit is facilitated by the smooth, waxed surface of the web fabric. Also, if desired, a mechanical agitator indicated schematically at 150 of FIG. 1 may be attached suitably to one of the frame members further to promote the movement of the fruit.

After the fruit has been harvested, collecting web sections 100 are collapsed by unlocking cylinders 110 and energizing windlasses 114. This takes in cables 116 at the same time collapsing booms 102, 104, 106 and supporting the collapsed web fabric 140 so that it does not drag on the ground. The apparatus then is ready for maneuvering to another tree.

It is to be understood that the form of our invention herein shown and described is to be taken as a preferred example of the same and that various changes in the shape, size and arrangement of parts may be resorted to without departing from the spirit of my invention or the scope of the subjoined claims.

Having thus described our invention, we claim:
1. Fruit and nut harvesting operation comprising:
  (a) an elongated wheeled frame adapted for placement along one side of the trunk of a tree,
  (b) collecting trough means on the frame substantially parallel to the longitudinal axis thereof, extending along said one side of the trunk,
  (c) a fixed collecting web section underlying substantially one-half of the tree fastened to the trough means and inclined toward the same, along the side of the trough means remote from the trunk,
  (d) a pair of angularly collapsible collecting web sections, each underlying substantially one quarter of the tree and inclined toward the trough means on the side thereof adjacent the trunk,
  (e) mounting means for pivotally mounting the collapsible web sections on the trough means for angular movement in a substantially horizontal plane,
  (f) and drive means connected to the collapsible web sections for moving them angularly between extended and retracted positions.

2. The apparatus of claim 1 wherein the frame includes a tongue laterally offset in the direction opposite from the trough for maneuvering the frame close to the trunk of the tree.

3. The apparatus of claim 1 wherein the frame includes counterweight means for adjusting its center of gravity.

4. The apparatus of claim 1 wherein the collecting trough means includes endless conveyor means for conveying fruit collected by the apparatus to a handling station at one end of the trough means.

5. The apparatus of claim 1 including pivotal mounting means for pivotally mounting the fixed collecting web to the frame for angular movement in a vertical plane, and drive means connected to the web section for moving it vertically to a predetermined position of angular adjustment.

6. The apparatus of claim 5 wherein the drive means comprises an hydraulic cylinder.

7. The apparatus of claim 5 wherein each angularly collapsible collecting web section is mounted on a group of independently pivoted booms, the boom group having uncommon pivot points on the side of the trough means remote from the collapsible web sections.

8. The apparatus of claim 5 wherein the apparatus includes an apron extending horizontally from the side of the trough means and recessed to contain the tree trunk, and wherein each collapsible web section includes a plurality of radially extending booms pivotally mounted on the apron for angular movement in a horizontal plane.

9. The apparatus of claim 8 wherein the boom members of each collapsible section are interconnected by cable means, wherein the drive means for extending the collapsible web section comprises an hydraulic cylinder interconnecting the frame and one of the booms wherein the drive means for retracting the collapsible web section comprises windlass-driven cable means interconnecting the booms.

10. The apparatus of claim 8 including guide means mounted on the adjacent meeting edges of the collapsible collecting web sections arranged for guiding fruit away from the trunk of the tree as it gravitates into the trough means.

11. The apparatus of claim 10 wherein the guide is divided into outer and inner sections, the outer sections being fixed to the collapsible web sections and the inner sections being hinged thereto for permitting placement of the apparatus closely adjacent the tree trunk.

References Cited

UNITED STATES PATENTS

| | | | |
|---|---|---|---|
| 1,473,081 | 11/1923 | Cook | 56—329 |
| 2,602,279 | 7/1952 | Leighton | 56—329 |
| 2,714,281 | 8/1955 | Steele | 56—329 |
| 3,105,346 | 10/1963 | Stanclift | 56—329 |
| 3,105,347 | 10/1963 | Anderson et al. | 56—329 |

FOREIGN PATENTS 29,494  5/1925  France.

LUCIE H. LAUDENSLAGER, *Primary Examiner.*